United States Patent
Iguchi

(10) Patent No.: US 9,575,320 B2
(45) Date of Patent: Feb. 21, 2017

(54) OCULAR VIDEO DISPLAY DEVICE ENABLING NATURAL FIELD OF VIEW

(71) Applicant: TELEPATHY HOLDINGS CO., LTD., Tokyo (JP)

(72) Inventor: Takahito Iguchi, Tokyo (JP)

(73) Assignee: TELEPATHY HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/914,464

(22) PCT Filed: Aug. 22, 2014

(86) PCT No.: PCT/JP2014/072070
§ 371 (c)(1),
(2) Date: Feb. 25, 2016

(87) PCT Pub. No.: WO2015/029912
PCT Pub. Date: Mar. 5, 2015

(65) Prior Publication Data
US 2016/0209662 A1 Jul. 21, 2016

(30) Foreign Application Priority Data

Aug. 26, 2013 (JP) ................................ 2013-174856

(51) Int. Cl.
*G02B 27/14* (2006.01)
*G09G 5/00* (2006.01)
(Continued)

(52) U.S. Cl.
CPC ....... *G02B 27/0176* (2013.01); *G02B 27/0172* (2013.01); *G09G 5/00* (2013.01);
(Continued)

(58) Field of Classification Search
CPC . G02B 6/0011; G02B 27/0093; G02B 27/017; G02B 27/0172; G02B 27/0176; G02B 27/14; G02B 2027/0123; G02B 2027/0127; G02B 2027/0138; G02B 2027/014; G02B 2027/015; G02B 2027/0169; G02B 2027/0178; G02B 2027/0185; H04N 5/7491; G09G 5/00
(Continued)

(56) References Cited

U.S. PATENT DOCUMENTS

| 6,563,626 B1 | 5/2003 | Iwasaki |
| 7,719,769 B2 * | 5/2010 | Sugihara ............... G02B 6/0011 345/8 |

(Continued)

FOREIGN PATENT DOCUMENTS

| JP | 09-152563 | 6/1997 |
| JP | 11-212489 | 8/1999 |

(Continued)

*Primary Examiner* — Loha Ben
(74) *Attorney, Agent, or Firm* — Greer, Burns & Crain, Ltd.

(57) ABSTRACT

A video display device is provided that naturally displays a video without blocking an observer's field of view, and includes the following: a display optical system that displays a video; an ocular optical system that guides video light emitted from the display optical system to the optical pupil of an observer; and a support that supports the ocular optical system upon the light path of video light emitted from the display optical system. The support includes a first support plate and a second support plate that face each other, and the ocular optical system is located between the first support plate and the second support plate. An opening through which the observer's line of sight passes is formed at least partially between the first support plate and the second support plate.

5 Claims, 5 Drawing Sheets

(51) Int. Cl.
*G02B 27/01* (2006.01)
*H04N 5/64* (2006.01)
(52) U.S. Cl.
CPC ............ *G02B 2027/015* (2013.01); *G02B 2027/0123* (2013.01); *G02B 2027/0169* (2013.01); *G02B 2027/0178* (2013.01); *H04N 5/64* (2013.01)
(58) Field of Classification Search
USPC ................... 359/630–634; 345/7–9
See application file for complete search history.

(56) References Cited

U.S. PATENT DOCUMENTS

| | | | | |
|---|---|---|---|---|
| 8,446,676 B2* | 5/2013 | Sugihara | ............ | G02B 27/0176 353/119 |
| 8,964,298 B2* | 2/2015 | Haddick | ................ | G06F 3/013 359/630 |
| 9,223,134 B2* | 12/2015 | Miller | ................ | G02B 27/0093 |
| 9,229,227 B2* | 1/2016 | Border | ............... | G02B 27/0093 |
| 2007/0058261 A1 | 3/2007 | Sugihara et al. | | |
| 2011/0234476 A1* | 9/2011 | Sugihara | ............ | G02B 27/0172 345/8 |

FOREIGN PATENT DOCUMENTS

| | | |
|---|---|---|
| JP | 2004-317798 | 11/2004 |
| JP | 2006-145998 | 6/2006 |
| JP | 2008-165063 | 7/2008 |
| JP | 2008-216599 | 9/2008 |
| JP | 2010-122478 | 6/2010 |
| JP | 2012-063638 | 3/2012 |
| WO | 0079329 A1 | 12/2000 |
| WO | 0079330 A1 | 12/2000 |

* cited by examiner (a)

(b)

OCULAR VIDEO DISPLAY DEVICE ENABLING NATURAL FIELD OF VIEW

BACKGROUND

The present invention relates to an eyepiece image device installed in products such as head mount displays (HMDs). In a concrete sense, the image display device presented as the present invention is an optical device located in front of an eye of the observer, which guides image light projected from components such as a liquid crystal display (LCD) to an eye of the observer so that he or she visually recognizes an image. The present invention is mainly intended to achieve an eyepiece image device that does not block the field of vision of the observer while offering a natural wearability, and to decrease the size of the structure and achieve a stylish shape.

In recent years, demand is growing for wearable devices, defined as devices that can be attached to the body of users for use, such as HMDs used by attaching to the head. Furthermore, to name a few, various types of sensor devices and image display devices including LCDs have been downsized to a size installable in wearable devices; wearable devices coming with those devices are being developed at a rapid pace.

For example, conventional HMDs are disclosed in patent documents 1 through 3. The conventional HMDs disclosed in them have a common structure in which image light projected from the display element is propagated in the direction of the width of the eyes of the observer (horizontal direction) in the prism and guided to the optical pupils.

PRIOR ART DOCUMENTS

Patent Documents

Patent document 1: Patent Application Publication No. 2004-317798

Patent document 2: Patent Application Publication No. 2008-165063

Patent document 3: Patent Application Publication No. 2010-122478

SUMMARY

Most conventional HMDs are the so-called "eyeglass-type". Eye-glass HMDs have a structure in which lenses and a frame which supports the lenses are located in front of the eyes of the observer, and an image display device with components such as display elements are attached to these lenses or frame. With such eyeglass-type HMDs, because image display devices can be attached to eyeglass lenses or frame, these HMDs have been considered to allow relatively large image display devices to be safely attached.

However, wearing a conventional eyeglass-type HMD means that lenses and frame are constantly located in front of the eyes of the observer, which causes the observer to have a clear sense of wearing something. In other words, one problem with conventional HMDs is that the observer cannot escape from feeling the presence of the HMD because lenses and/or frames are unavoidably inside the field of vision of the observer. In addition, even persons with good eyesight must wear eyeglass-type devices, causing the appearance of such persons to be unnatural.

Furthermore, conventional eyeglass-type HMDs tend to come with relatively large image display devices. Therefore, in a normal design of conventional image display devices, a display optical system which displays images and an eyepiece optical system which guides image light from this display optical system to the eyes of the observer are stored in a single chassis. This chassis basically has only a window to allow image light projected from the eyepiece optical system to transmit, and the remaining part is shielded to prevent light from invading. If such an image display device chassis exists in front of the eyes of a wearer, that chassis frequently enters into the field of vision of the wearer. Therefore, with the structure of conventional image display devices, there is a problem that the field of vision of the wearer is limited, and the wearer feels unnatural or different.

As a result, currently, there is a need for technologies to downsize the structure of even such eyepiece image display devices installed in devices such as HMDs so that images can be displayed in a natural manner without blocking the field of vision of the observer.

In addition, currently, it can be said that not conventional eyeglass-type but stylishly designed HMDs that come with small image display devices are desired.

The inventor of the present invention, as a result of thoroughly considering means to solve the problem of the previous invention mentioned hereinbefore, gained knowledge that makes it possible to downsize the structure itself of image display devices and prevent the field of vision of the observer from being blocked to the extent possible, by supporting an eyepiece optical system on the optical path of the image light projected from the display optical system with the use of two support plates and by forming an opening between these two support plates that allows the line of sight of the observer looking into the eyepiece optical system to pass through. The present inventor realized that the problem of the prior art can be solved based on the knowledge above, and completed the present invention. The present invention has a structure that is described concretely as follows.

The present invention relates to an image display device. The image display device of the present invention has a display optical system 10, an eyepiece optical system 20, and a support 30. The display optical system 10 includes a display element that displays images. The eyepiece optical system 20 guides image light projected from the display optical system 10 to the optical pupil of the observer. The support 30 supports the eyepiece optical system 20 on the optical path of image light projected from the display optical system 10. The support 30 has the first support plate 31 and the second support plate 32 facing each other. The eyepiece optical system 20 is located between the first support plate 31 and the second support plate 32. Between the first support plate 31 and the second support plate 32, at least partly, an opening 33 is formed through which the line of sight of the observer passes.

As shown in the structure above, if the opening 33 is formed between the first support plate 31 and the second support plate 32 that supports the eyepiece optical system 20, the observer can visually see the back side of the image display device through the opening 33. In this structure, two support plates 31 and 32 are located in front of the eye of the observer; however, the observer visually recognizes only the thickness parts of the first support plate 31 and the second support plate 32. Therefore, the present invention allows the observer to see images with as little as possible blocking the field of vision of the observer. In addition, the structure of the present invention basically supports the eyepiece optical system 20 with the two support plates 31 and 32 only, which makes it possible to downsize the structure of the entire image display device. As a result, the use of small image display devices covered by the present invention achieves more freedom in designing HMDs and expands the range of designs. Therefore, the present invention also makes it possible to create more stylishly designed HMDs different from conventional eyeglass-type HMDs.

In the image display device of the present invention, the support 30 preferably has the first storage chamber 34 and the second storage chamber 35. The first storage chamber 34 stores the display optical system 10, and has an exit window through which image light from the display optical system 10 passes. The second storage chamber 35 stores the eyepiece optical system 20, and has an entrance window through which image light from the display optical system 10 passes and an eyepiece window through which light guided by the eyepiece optical system 20 passes. The first storage chamber 34 and the second storage chamber 35 are preferably connected by the first support plate 31 and the second support plate 32.

As shown in the structure above, by storing the display optical system 10 and the eyepiece optical system 20 in the storage chamber 34 and the storage chamber 35, respectively, and preventing outside light from directly entering into the display optical system 10 and the eyepiece optical system 20, it becomes possible to prevent images from being displayed unclearly. In addition, by connecting the first storage chamber 34 and the second storage chamber 35 by the first support plate 31 and the second support plate 32, it becomes possible to downsize the design of image display devices.

In the image display device of the present invention, the opening 33 is preferably formed between the first storage chamber 34 and the second storage chamber 35.

As shown in the structure above, by forming the opening 33 between the first storage chamber 34 and the second storage chamber 35, it becomes easier for the line of sight of the observer to pass through the opening 33, which secures a wide field of vision for the observer.

In the image display device of the present invention, the first support plate 31 and the second support plate 32 preferably have an inclined part 31a and an inclined part 32a in a manner that the closer they get from the first storage chamber 34 to the second storage chamber 35, the narrower the distance between them becomes.

As shown in the structure above, if the first support plate 31 and the second support plate 32 are inclined, the second storage chamber 35 becomes smaller than the first storage chamber 34, which is located in front of the eye of the observer. Therefore, it is possible to prevent the second storage chamber 35 from blocking the field of vision of the observer. In addition, it has become clear that the two support plates 31 and 32 are less visible if the two support plates 31 and 32 extend at a slight incline rather than extending in parallel in the lateral direction (direction of the width of the eye). To that end, by forming the inclined part 31a and the inclined part 32a on the two support plates 31 and 32, it becomes possible to provide the observer with a more natural field of vision.

Another aspect of the present invention is a HMD that comes with the image display device above.

Effect of the Invention

As described hereinbefore, the present invention can downsize the structure of even eyepiece image display devices installed in devices such as HMDs so that images can be displayed in a natural manner without blocking the field of vision of the observer. As a result, installing small image display devices covered by the present invention in HMDs can allow more freedom in designing HMDs and expand the range of designs.

DETAILED DESCRIPTION

Hereinafter, an embodiment for working the present invention is described using drawings. The present invention is not limited to the embodiment described hereinafter, but includes amendments thereto made as needed by those skilled in the art to the extent obvious. In the figures prepared for the claimed invention, an XYZ orthogonal coordinate system is defined for the purpose of clearly showing the three-dimensional directions of the device. In the specifications of the claimed invention, for convenience purposes, the X-axis direction is set as the lateral direction, the Y-axis as the vertical direction, and the Z-axis as the depth direction. In addition, in the specifications of the claimed invention, "A~B" basically means "A or higher but below B".

Figure 1:
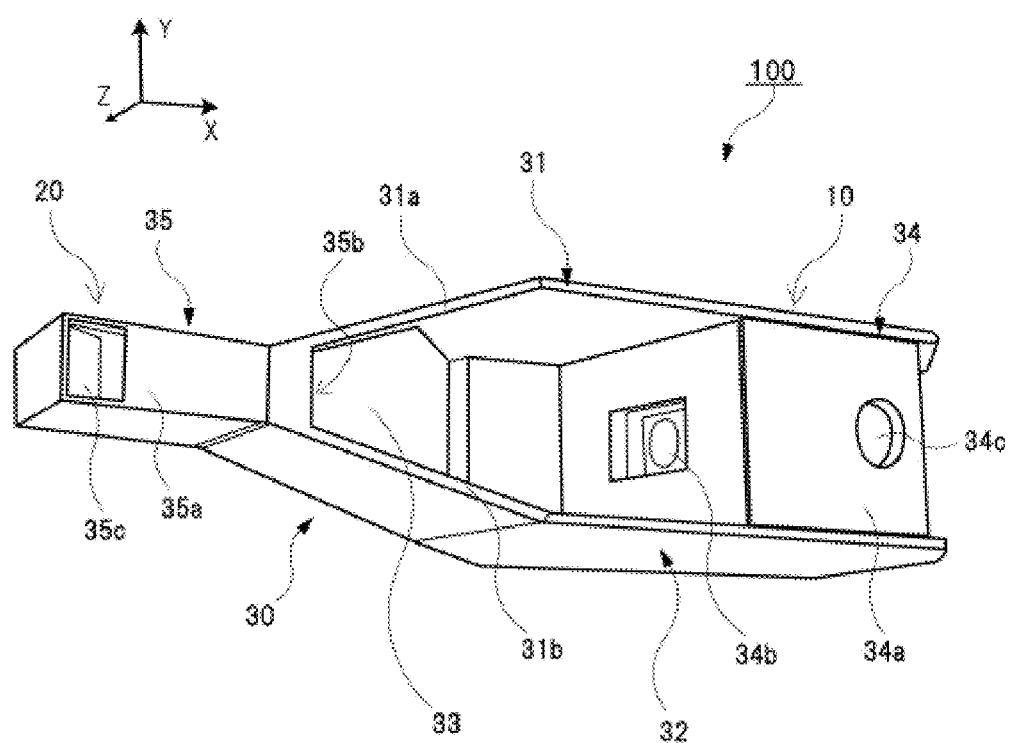
FIG. 1 is a perspective view of an example appearance of the image display device covered by the present information.

FIG. 1 is an external perspective view of an example embodiment of the image display device 100 covered by the present information. FIG. 1 particularly shows the appearance of the support 30 that comprises the image display device 100. The support 30 is a tool that supports the display optical system 10 which displays images and the eyepiece optical system 20 which guides image light projected from the display optical system 10 to the optical pupil of the observer. The support 30 supports the eyepiece optical system 20 on the optical path of image light projected from the display optical system 10. In addition, FIG. 2(a) is a front view of the image display device 100 seen from the front (X-Y surface), and FIG. 2(b) is a planar view of the image display device 100 seen from the planar surface (X-Z surface)

Figure 2:
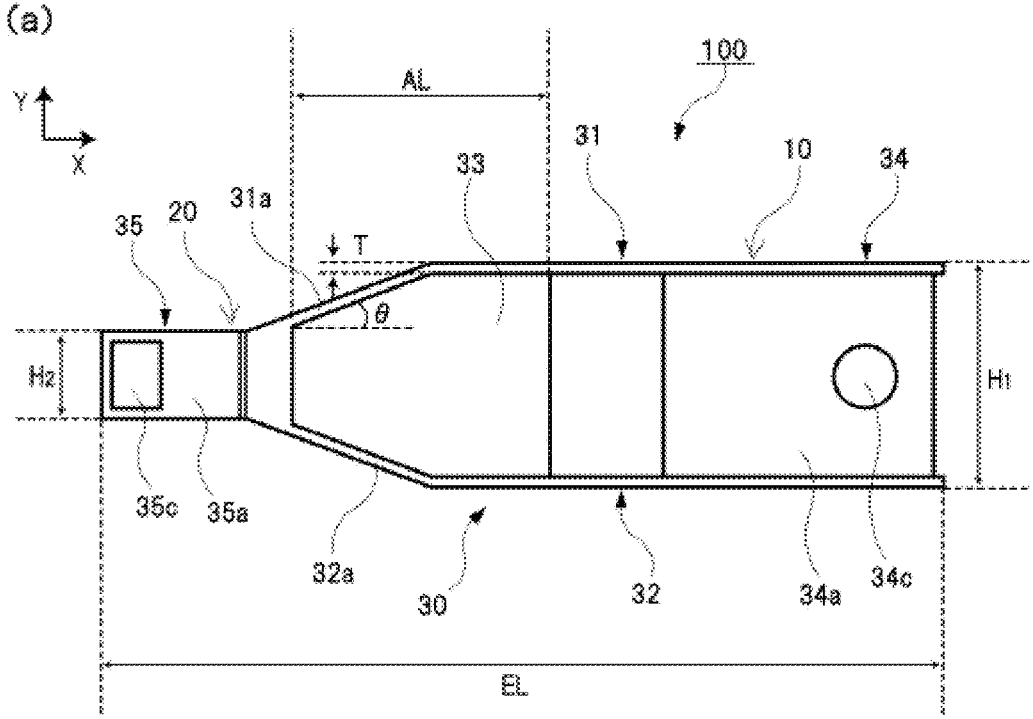
FIG. 2(a) is a front view of the image display device and FIG. 2(b) is a plane view of the image display device.
Figure 2:
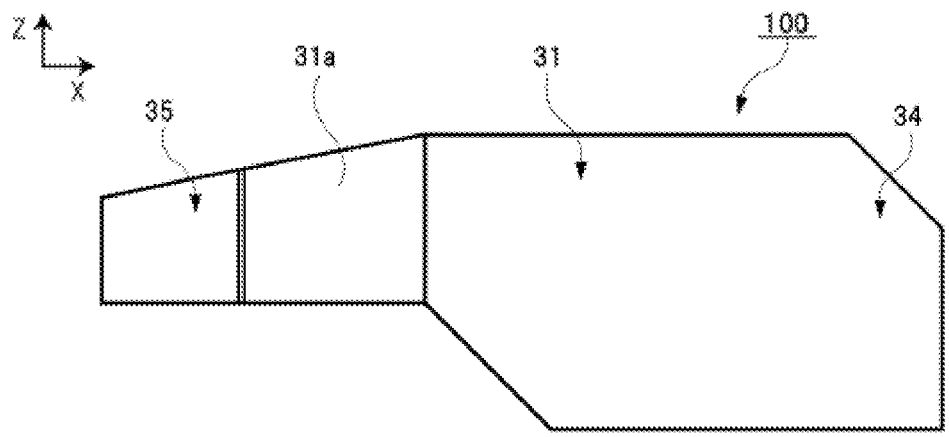

As shown in FIG. 1 and FIG. 2, the support 30 has two support plates 31 and 32 which face each other in the vertical direction (Y-axis direction). In the specifications of the claimed invention, the two support plates are called the first support plate 31 and the second support plate 32, respectively. In the embodiment of the claimed invention, the first support plate 31 is located on the lower side, and the second support plate 32 is located on the lower side.

As shown in FIG. 1, at the base end side of the two support plates 31 and 32, the first storage chamber 34 is formed. The first storage chamber 34 is a chamber comprising the upper surface formed by part of the first support plate 31, the bottom surface formed by part of the second support plate 32, and the side wall 34a vertically standing in the vertical direction (Y-axis direction) and connecting the first support plate 31 and the second support plate 32. The first storage chamber 34 stores the display optical system 10 which has components such as an image element for displaying images. In addition, as shown in FIG. 1, on the side wall 34a of the first storage chamber 34, an exit window 34b through which optical images projected from the display optical system 10 passes and an insertion window 34c through which various cables are inserted for connection to the display optical system 10. To the display optical system 10, control cables for controlling the function of the display optical system 10 (not shown) and power cables for supplying power to the display optical system 10 (not shown) can be connected.

As shown in FIG. 1, at the head end side of the two support plates 31 and 32, the second storage chamber 35 is formed. The second storage chamber 35 is a chamber comprising the upper surface formed by part of the first support plate 31, the bottom surface formed by part of the second support plate 32, and the side wall 35a vertically standing in the vertical direction (Y-axis direction) and connecting the first support plate 31 and the second support plate 32. The second storage chamber 35 stores the eyepiece optical system 20 including a prism which guides image light projected from the display optical system 10 to the optical pupil of the observer. On the side wall 35a of the second storage chamber 35, an entrance window 35b through which image light projected from the display optical system 10 enters and an eyepiece window 35c through which image light projected from the eyepiece optical system 20 passes are formed.

As shown in FIG. 1, there is open space between the first storage chamber 34 and the second storage chamber 35. Thus, image light projected from the display optical system 10 reaches this space through the exit window 34b of the first storage chamber 34. Subsequently, the image light that passed through the exit window 34b enters into the eyepiece optical system 20 via this space after passing through the entrance window 35b of the second storage chamber 35. After that, the image light is guided to the optical pupil of the observer by the eyepiece optical system 20.

In addition, as shown in FIG. 1, the opening 33 through which the line of sight of the observer passes is formed at least partly between the first support plate 31 and the second support plate 32. To describe this more in detail, the opening 33 is that through which the line of sight of the observer passes when the optical pupil of the observer is in a position facing the eyepiece window 35c. That is to say, as shown in FIG. 1, the opening 33 constitutes the part between the first support plate 31 and the second support plate 32 in which no side wall standing vertically in the vertical direction (Y-axis direction) is formed. As shown in FIG. 1, the opening 33 is preferably formed at a position corresponding to the space between the first storage chamber 34 and the second storage chamber 35, in the lateral direction (X-axis direction).

Figure 3:
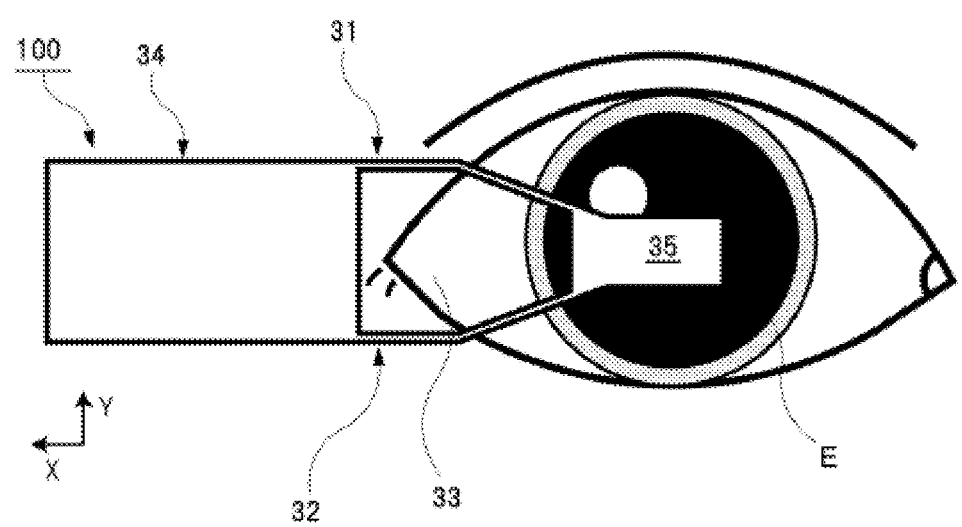
FIG. 3 schematically shows a condition in which the image display device is located in front of the optical pupil of the observer.

FIG. 3 schematically shows the image display device 100 having the opening 33, located in front of an optical pupil E of the observer. As shown in FIG. 3, by forming the opening 33 on the support 30 of the image display device 100, it becomes possible to lessen the degree to which the image display device 100 blocks the field of vision of the observer. That is to say, because the image display device 100 no longer enters into the field of vision of the observer, a natural range of field of vision of the observer can be maintained even when images are displayed for the observer. In addition, forming the opening 33 on the image display device 100 also lessens the degree to which the face of the observer is covered by the image display device 100. Therefore, it becomes possible to mitigate the unnaturalness of the appearance of the observer wearing a device equipped with the image display device 100, such as an HMD.

Next, the structure of the support 30 of the image display device 100 is described more concretely with reference to FIG. 2.

As shown in FIG. 2(a), in the vertical direction (Y-axis direction), the height of the first storage chamber 34 and that of the second storage chamber 35 are different. That is to say, the height of the second storage chamber 35 ($H_2$) is lower than the height of the first storage chamber 34 ($H_1$) ($H_2$<$H_1$). For example, provided that the height of the first storage chamber 34 ($H_1$) is 100%, the height of the second storage chamber 35 ($H_2$) is preferably 80% or less, 60% or less, or 40% or less. Concretely, the height of the second storage chamber 35 ($H_2$) is preferably in the range of 10%~80%, 20%~60%, or 30%~50% relative to the height of the first storage chamber 34 ($H_1$). Because the second storage chamber 35 is what is located in front of the eye of the observer, it is preferably smaller than the first storage chamber 34.

The first support plate 31 and the second support plate 32 connect the first storage chamber 34 and the second storage chamber 35, which have a different height from each other. Therefore, the inclined part 31a and the inclined part 32a are located on the first support plate 31 and the second support plate 32 so that the height of the first storage chamber 34 matches the height of the second storage chamber 35. That is to say, the inclined part 31a and the inclined part 32a are inclined so that the closer they get from the first storage chamber 34 to the second storage chamber 35, the narrower the distance between them becomes. Particularly, as shown in FIG. 1 and FIG. 2, the inclined part 31a and the inclined part 32a are preferably formed on the part on which the opening 33 is formed. It has become clear that, as described hereinbefore, by making the first support plate 31 and the second support plate 32 inclined on the part through which the line of sight of the observer passes (opening 33), there is less chance for the observer to visually recognize the two support plates 31 and 32. That is to say, there is less chance for the observer to visually recognize the support plates 31 and 32 if they extend diagonally inclined than if they extend linearly. Therefore, by forming the inclined part 31a and the inclined part 32a on the first support plate 31 and the second support plate 32, it becomes possible to secure an even better field of vision of the observer.

The angle θ of inclination of the support plates 31 and 32 relative to the optical axis of image light extending to the lateral direction (X-axis direction) of the image display device 100 may be, for example, 5~60 degrees, 10~45 degrees, or 15~30 degrees. In the embodiment shown in FIG. 2(a) and other figures, the angle of inclination of the first support plate 31 and the angle of inclination of the second support plate 32 are configured in the same range. However, the angle of inclination of the first support plate 31 and the angle of inclination of the second support plate 32 may be different from each other. Furthermore, although not shown using figures, both the first support plate 31 and the second support plate 32 do not necessarily need to have an inclined part. For example, only either the first support plate 31 or the second support plate 32 may have an inclined part.

FIG. 2(a) also shows the length of the support 30 in the lateral direction (X-axis direction) with the sign EL, and the length of the opening 33 in the lateral direction (X-axis direction) with the sign AL. The length AL of the opening 33 is preferably 20% or higher, 30% or higher, or 40% or higher, provided that the length EL of the support 30 is 100%. Concretely, the length AL of the opening 33 is preferably in the range of 20%~90%, 30%~80%, or 40%~70% relative to the length EL of the support 30. As shown hereinbefore, by arranging the area of the opening 33 to be large, it becomes possible to secure a wide field of vision for the observer.

FIG. 2(a) also shows the thickness of the first support plate 31 and the second support plate 32 on the part in which the opening 33 is formed, with the sign T. For example, the thickness T of the support plates 31 and 32 is preferably 5 mm or less. Concretely, the thickness T of the support plates 31 and 32 is preferably 0.1 mm~0.5 mm, and more preferably 0.5 mm~3 mm or 1 mm~2 mm. The present invention is configured to support the eyepiece optical system 20 by the two support plates 31 and 32. Therefore, the eyepiece optical system 20 can still be supported sufficiently strongly, even if the thickness of the support plates 31 and 32 is decreased. In addition, by decreasing the thickness of the support plates 31 and 32, there is less chance for the observer to visually recognize the support plates 31 and 32. As a result, it becomes possible to achieve a natural field of vision of the observer.

Figure 4:
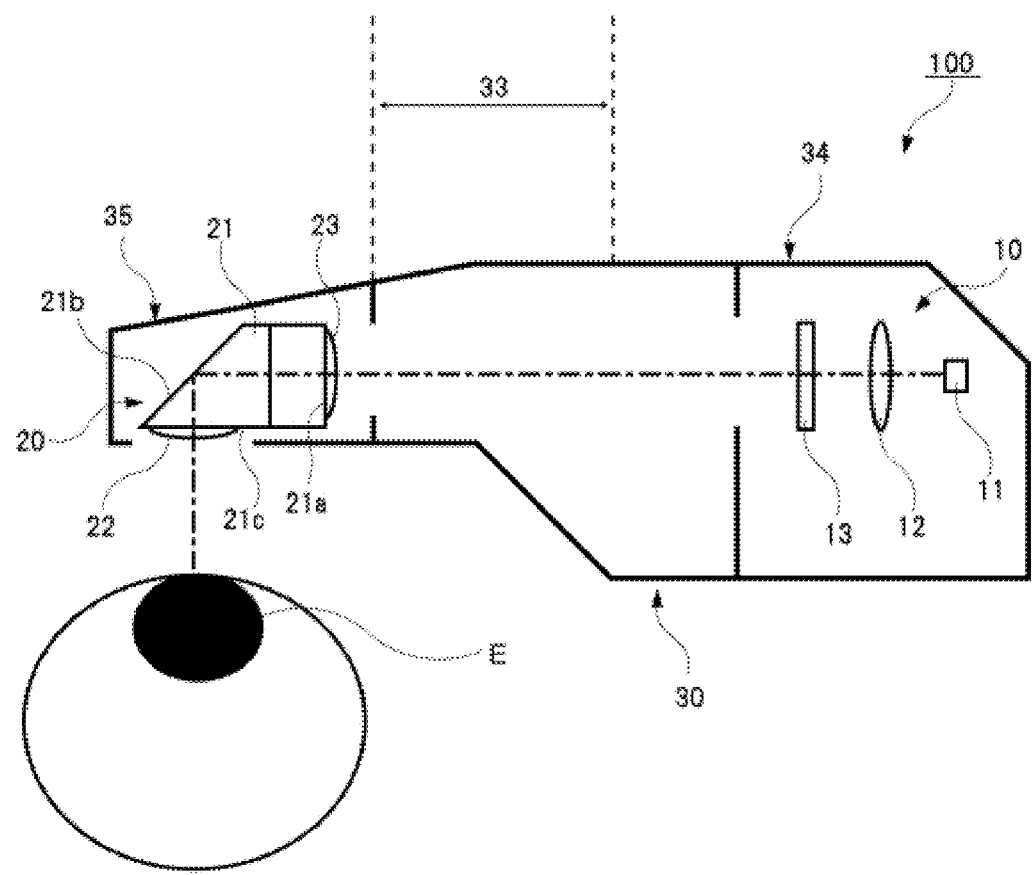
FIG. 4 is a block view of an example optical system installed in the image display device.

Next, the optical systems installed in the image display device 100 are described more in detail with reference to FIG. 4. FIG. 4 is a view of the inside of the image display device 100 seen from the planar surface (X-Z surface). As shown in FIG. 4, the image display device 100 comes with the display optical system 10 which displays images and the eyepiece optical system 20 which guides image light projected from the display optical system 10 to the optical pupil E of the observer. As described hereinbefore, the display optical system 10 is stored in the first storage chamber 34 and the eyepiece optical system 20 is stored in the second storage chamber 35. The optical systems shown in FIG. 4 are merely an embodiment of the present invention. In the present invention, not only the optical systems shown in FIG. 4 but also other publicly known systems can be adopted as needed.

As shown in FIG. 4, the display optical system 10 has a source of light 11, a collecting lens 12, and a display element 13. The source of light 11 is preferably one that emits colors in R (red), G (green), and B (blue). The source of light 11 is preferably configured by an RGB-integrated LED panel. The source of light 11 may be one that emits a single color light or white light. The collecting lens 12 collects light from the source of light 11 and provides it to the display element 13. The display element 13 is a component that displays images by modulating the incident light depending on image data. The display element 13 is preferably configured by, for example, a transmission-type liquid crystal display in which pixels that serve as regions through which light passes are arranged in a matrix. To that end, a liquid crystal display (LCD) is used in the display optical system 10.

Next, the eyepiece optical system 20 is an optical system that guides image light from the display element 13 described above to the optical pupil E. The eyepiece optical system 20 has a prism 21, an eyepiece lens 22, and a correction lens 23. The prism 21 is a light guiding component that internally guides image light from the display element 13. The prism 21 is shaped to have an entrance surface 21a, a total reflection surface 21b, and an exit surface 21c for image light. The prism 21 may be configured by a single prism or in combination of multiple prisms. The eyepiece lens 22 has axially asymmetric and positive power and collects image light totally reflected by the total reflection surface 21b to the optical pupil E. The eyepiece lens 22 is integrated with the prism 21 by being jointed to the exit surface 21c of the prism 21. The correction lens 23 is a lens for correcting optical aberration occurring at components such as the eyepiece lens 22. The eyepiece lens 22 is integrated with the prism 21 by being joined to the entrance surface 21a of the prism 21.

Here, the configuration of the prism 21 is concretely described. The entrance surface 21a of the prism 21 is formed in the depth direction (Z-axis direction) which vertically crosses with the optical axis of image light progressing in the lateral direction (X-axis direction). The exit surface 21c is formed facing the optical pupil E of the observer. The total reflection surface 21b is, for example, rectangular (oblong) and functions as a means to perpendicularly refract the optical path of image light. Concretely, the total reflection surface 21b totally reflects in the Z-axis direction the image light that enters the prism via the entrance surface 21a and progresses in the X-axis direction.

According to the configuration above, light projected from the source of light 11 is collected by the collecting lens 12 and then enters into the display element 13. This light is modulated by the display element 13 into image light. Subsequently, the image light projected from the display element 13 enters into the eyepiece optical system 20. In the eyepiece optical system 20, the image light enters into the prism 21 via the correction lens 23 and the entrance surface 21a. After that, the image light progresses inside the prism 21 in the lateral direction (X-axis direction), and changes its direction with the optical path refracted by the total reflection surface 21b and progresses in the depth direction (Y-axis direction). As a result, the image light is guided to the optical pupil E of the observer via the exit surface 21c of the prism 21 and the eyepiece lens 22. The observer can see an enlarged virtual image displayed by the display element 13 at the position of the optical pupil E.

Figure 5:
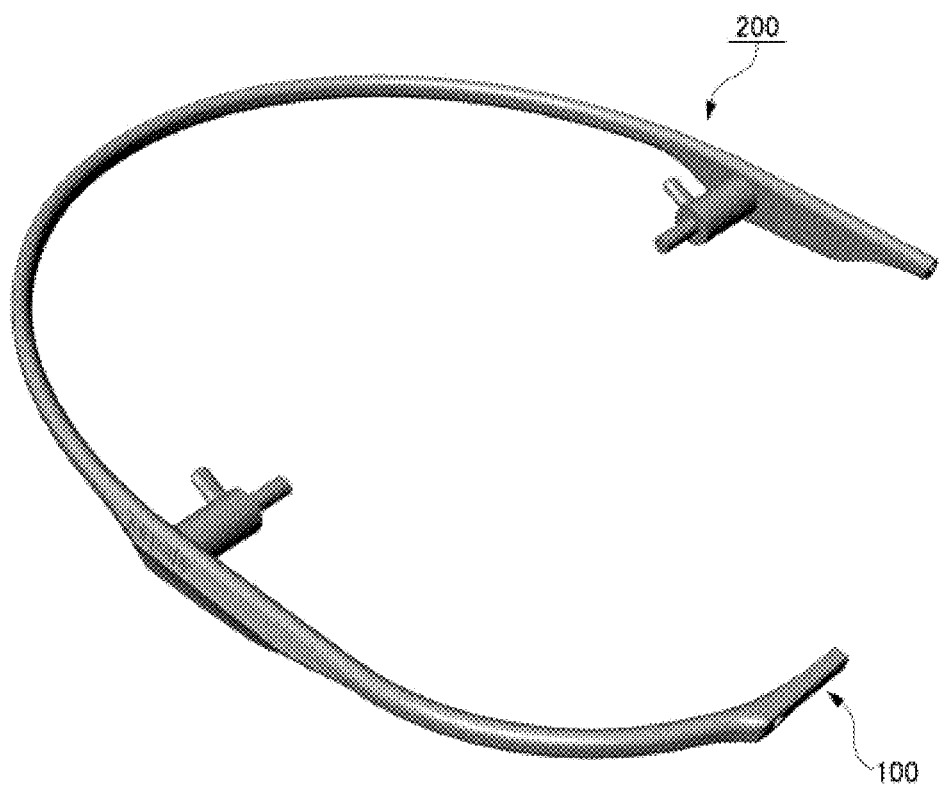
FIG. 5 is a perspective view of an example design of a HMD coming with the image display device.

FIG. 5 is an example design of a head mount display (HMD) 200 equipped with the image display device 100. As shown in FIG. 5, the image display device 100 can be extremely downsized and installed on the eyepiece part of the HMD 200. As is shown, the image display device 100 of the present invention makes it possible to achieve stylishly designed HMDs that are different from conventional eyeglass-type HMDs.

So far, in the specifications of the claimed invention, an embodiment was described with reference to drawings, in order to express the content of the present invention. However, the present invention is not limited to the embodiment described hereinbefore, and encompasses obvious modifications and improvements made by those skilled in the art based on the matters described in the specifications of the claimed invention.

The present invention relates to an eyepiece image device installed in products such as HMDs. Therefore, the present invention is suitable and useful in the industry of manufacturing wearable devices.

DESCRIPTION OF THE NUMERALS

10: Display optical system 11: Source of light 12: Collecting lens 13: Display element 20: Eyepiece optical system 21: Prism 21a: Entrance surface 21b: Total reflection surface 21c: Exit surface 22: Eyepiece lens 23: Correction lens 30: Support 31: First support plate 32: Second support plate 31a, 32a: Inclined parts 33: Opening 34: First storage chamber 34a: Side wall 34b: Exit window 34c: Insertion window 35: Second storage chamber 35a: Side wall 35b: Entrance window 35c: Eyepiece window 100: Image display device 200: Head mount display

What is claimed is:

1. An image display device comprising: a display optical system which displays images, an eyepiece optical system which directs image light projected from said display optical system to an optical pupil of an observer, and a support which supports said eyepiece optical system on an optical path of the image light projected from said display optical system; where said support has a first support plate and a second support plate facing each other, where said eyepiece optical system is located between said first support plate and said second support plate, and where an opening through which a line of sight of said observer passes is formed at least partly between said first support plate and said second support plate.

2. The image display device of claim 1 in which said support has a first storage chamber, which stores said display optical system and has an exit window through which said image light passes, and a second storage chamber, which stores said eyepiece optical system and has an entrance window through which said image light passes and an eyepiece window through which light guided by said eyepiece optical system passes, and said first storage chamber and said second storage chamber are connected by said first support plate and said second support plate.

3. The image display device of claim 2 in which said support is formed between said first storage chamber and said second storage chamber.

4. The image display device of claim 3 wherein said first support plate and said second support plate have inclined parts that are inclined in a manner that the closer they get from said first storage chamber to said second storage chamber, the narrower the distance between them becomes.

5. A head mount display coming with an image display device described in claim 1.

* * * * *